United States Patent [19]

Bui

[11] Patent Number: 4,799,150
[45] Date of Patent: Jan. 17, 1989

[54] INTERFACE SYSTEM BETWEEN A HOST COMPUTER AND A PERIPHERAL PROCESSOR WITH ADDRESS DETECTION CIRCUITRY

[75] Inventor: Le Bui, Fremont, Calif.

[73] Assignee: Orchid Technology, Fremont, Calif.

[21] Appl. No.: 760,163

[22] Filed: Jul. 29, 1985

[51] Int. Cl.[4] .................. G06F 13/12; G06F 12/00; G06F 15/16
[52] U.S. Cl. .................................................. 364/200
[58] Field of Search ................ 364/711, 200 MS File, 364/900 MS File

[56] References Cited

U.S. PATENT DOCUMENTS

| | | | |
|---|---|---|---|
| 4,247,891 | 1/1981 | Flynn | 364/711 |
| 4,375,665 | 3/1983 | Schmidt | 364/200 |
| 4,443,846 | 4/1984 | Adcock | 364/200 |
| 4,466,098 | 8/1984 | Southard | 371/9 |
| 4,542,456 | 9/1985 | Hill | 364/200 |
| 4,554,632 | 11/1985 | Nygaard | 364/300 |
| 4,692,897 | 9/1982 | Crabbe | 364/900 |
| 4,695,945 | 9/1987 | Irwin | 364/200 |
| 4,703,420 | 10/1987 | Irwin | 364/200 |
| 4,727,480 | 2/1988 | Albright et al. | 364/200 |

OTHER PUBLICATIONS

"High-Order Zero Suppression", by Deskevich, IBM Technical Disclosure Bulletin, vol. 9, No. 6, Nov. 1966, pp. 609–610.
Digital Electronics, by Taub & Schilling, ©1977, pp. 430–433.

Primary Examiner—Gary V. Harkcom
Assistant Examiner—Lawrence E. Anderson
Attorney, Agent, or Firm—Paul Hentzel

[57] ABSTRACT

An interface circuit controls the unloading of a host computer system onto a peripheral processor unit. The interface circuit has a normal mode of operation which is independent of the host computer. During the normal mode, the peripheral unit processes data previously supplied by the host computer. The interface device has a trap I/O mode of operation in which information flows between the host computer and the peripheral unit. The trap I/O mode is initiated by a range of instruction addresses from the peripheral unit. In one embodiment, any instruction address less than a predetermined critical value initiates the trap I/O mode. The host computer acknowledges the trap I/O mode, and executes the instruction at the host level to advance the peripheral process. In the trap I/O mode, the peripheral processor operates simultaneously with and independently of the peripheral unit to permit unloading of the host computer. In addition, the peripheral unit has a faster clock and more operating bits than the host system; and can accelerate the processing of the host data.

10 Claims, 5 Drawing Sheets

FIGURE 4
COMMAND STATUS
CONTROLLER
400
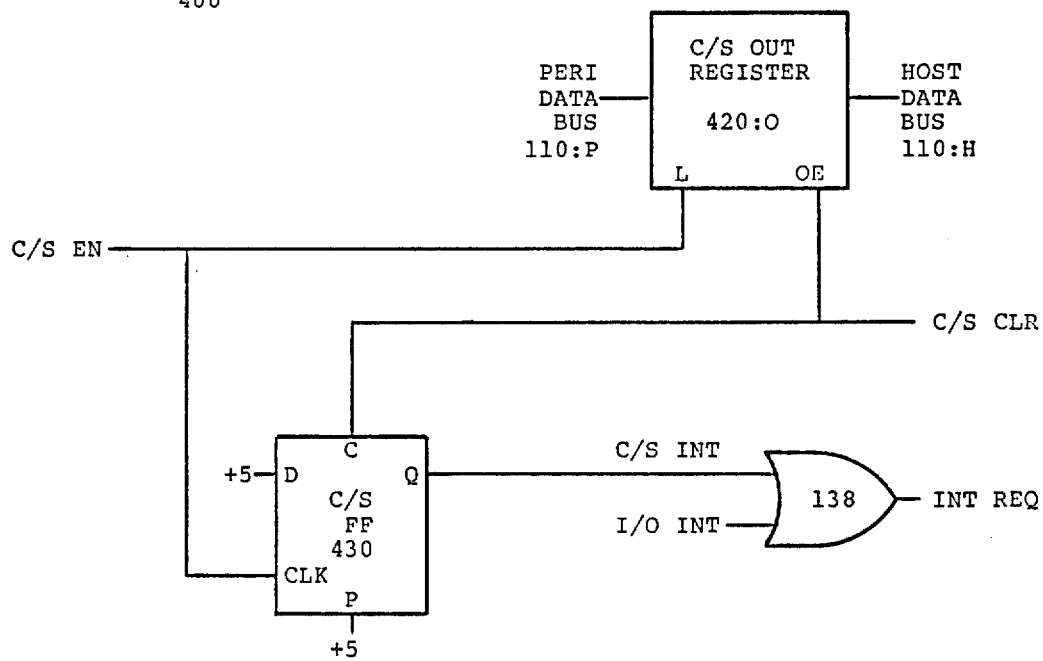
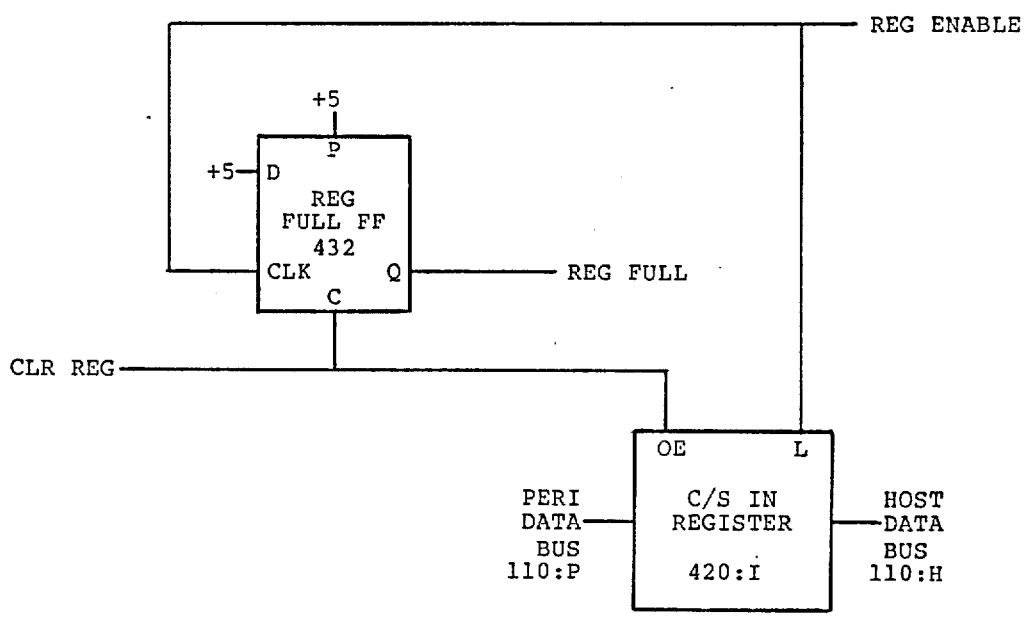

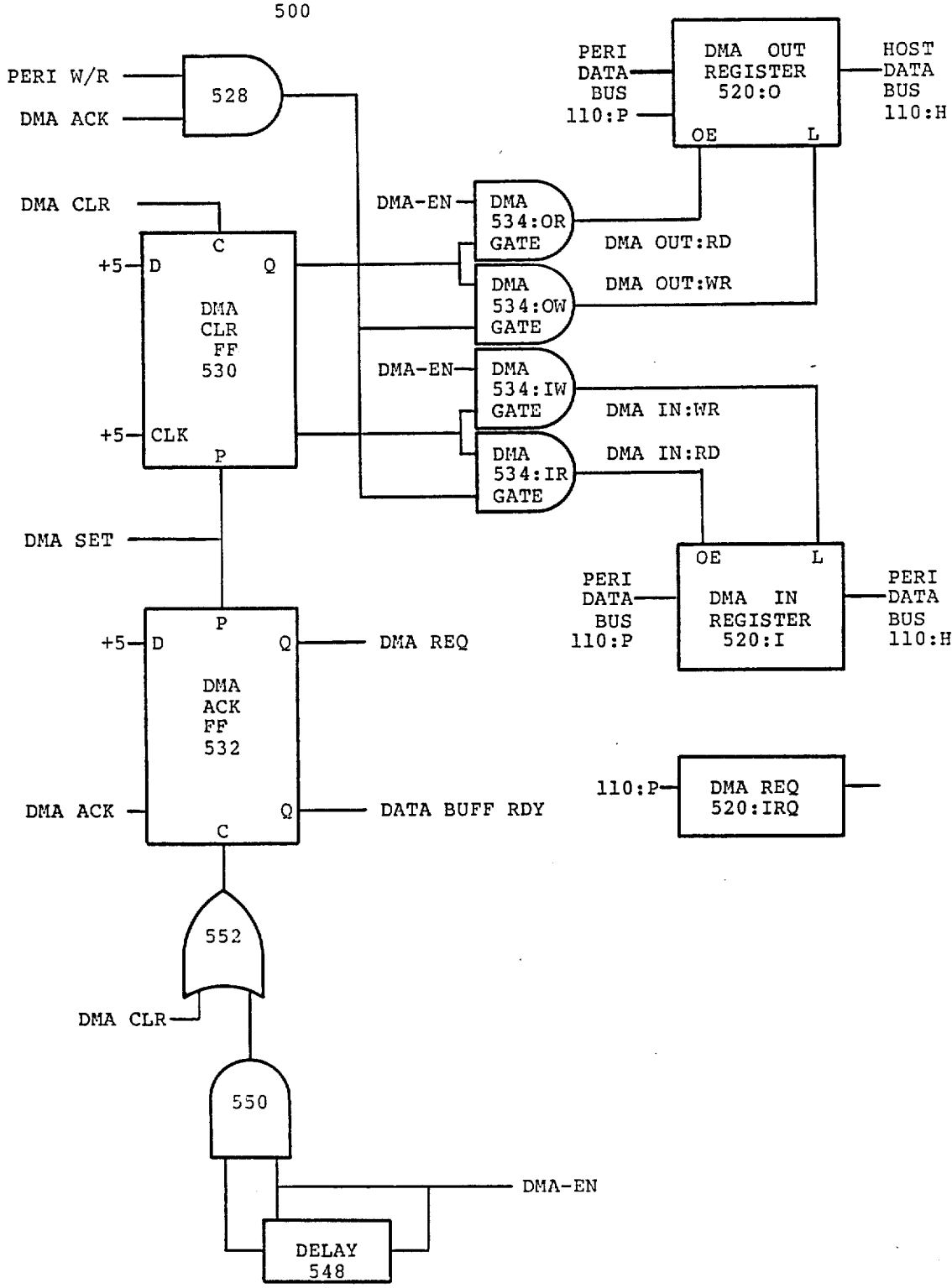

INTERFACE SYSTEM BETWEEN A HOST COMPUTER AND A PERIPHERAL PROCESSOR WITH ADDRESS DETECTION CIRCUITRY

TECHNICAL FIELD

This invention relates to an Interface System between a Host Computer and a Peripheral Processor, and more particularly to such an Interface System which is instruction address sensitive for controlling the mode of operation thereof.

BACKGROUND

The host or base computer in an expanding, fully used computer system soon becomes "loaded" with an increasing number of tasks to perform in a fixed amount of time. As the users become more familiar with the keyboard, the system operation, and the peripheral capabilities; they burden the base computer with more and more tasks. Expansion loading by add-on terminals, drives, modems, and other peripheral devices, also increased the burden on the base computer.

A prior solution to this increasing load problem in personal computers and desk top computers was to exchange the original microprocessor chip with a faster chip. The Intel 8088 microprocessor (4.77 MHZ) is commonly replaced by an Intel 8086 (8 MHZ). The clock rate was instantaneously practically doubled, reducing the effective host load to about one half.

However, the number of operating bits remained the same, and the base computer was still directly involved in each task performed by the system. The effective load reduction was soon lost as the number of skilled users increased and the system expanded. The base load problem was not solved by the chip switch; but merely postponed.

SUMMARY

It is therefore an object of this invention to provide an improved Interface System for unloading a Host Computer onto a Peripheral Processor.

It is a further object of this invention to provide an Interface System which is instruction address responsive for controlling the mode of operation.

It is a further object of this invention to provide such an Interface System which permits the Peripheral Processor to operate continuously with minimum interruptions.

It is a further object of this invention to provide such an Interface System in which the Peripheral Proccessor is isolated from the Host Computer during normal operation.

It is another object of this invention to provide such an Interface System in which the Peripheral Processor operates independently and simultaneously the Host Computer.

It is a further object of this invention to provide such an Interface System in which the Peripheral Processor has a foster clock than the Host Computer.

It is a further object of this invention to provide such an Interface System in which the Peripheral Processor has more operating bits than the Host Computer.

It is a further object of this invention to provide such an Interface System which is IBM compatible (compatible with Internation Business Machines).

Briefly, these and other objects of the present invention are accomplished by providing a computer interface system having a normal mode of operation and an I/O mode of operation. The interface system is adapted to connected between a host computer and a peripheral processor which operate independently from one on another during the normal mode of operation and which communicate with one another during the I/O mode of operation. The interface system has a peripheral bus connected to the peripheral processor for receiving instruction addresses from the peripheral processor, and for transferring data between the peripheral processor and the interface system. The interface system also has a host bus connected to the host computer and for transferring data between the host computer and the interface system.

An address detector within the interface system is responsive to the instruction addresses on the peripheral bus, for incrementing an I/O set device which terminates the normal mode of operation and initiates the I/O mode of operation. An I/O clear device terminates the I/O mode of operation and returns the interface system to the normal mode of operation in response to a host clear signal from the host computer. An address transfer register receives instruction addresses from the peripheral bus in response to a write signal from the peripheral processor, and for transferring the instruction addresses to the host computer on the host bus in response to a read address signal from the host computer.

A data-out transfer register receives data from the peripheral bus in response to a peripheral write signal from the peripheral processor, and for transferring the data to the host computer on the host bus in response to a host read signal from the host computer. A data-in transfer register receives data from the host bus in response to a host write signal from the host computer, and for transferring the data to the peripheral processor on the peripheral bus in response to a peripheral read signal from the peripheral processor.

BRIEF DESCRIPTION OF THE DRAWING

Further objects and advantages of the present Interface System and the operation thereof will become apparent from the following detailed description and drawing in which:

FIG. 4 is a schematic diagram showing Command/Status Controller 400 of FIG. 1; and FIG. 5 is a schematic diagram showing Direct Memory Acess Controller 500 of FIG. 1.

GENERAL INTERFACE SYSTEM 100

BLOCK DIAGRAM (FIG. 1)

Figure 1:
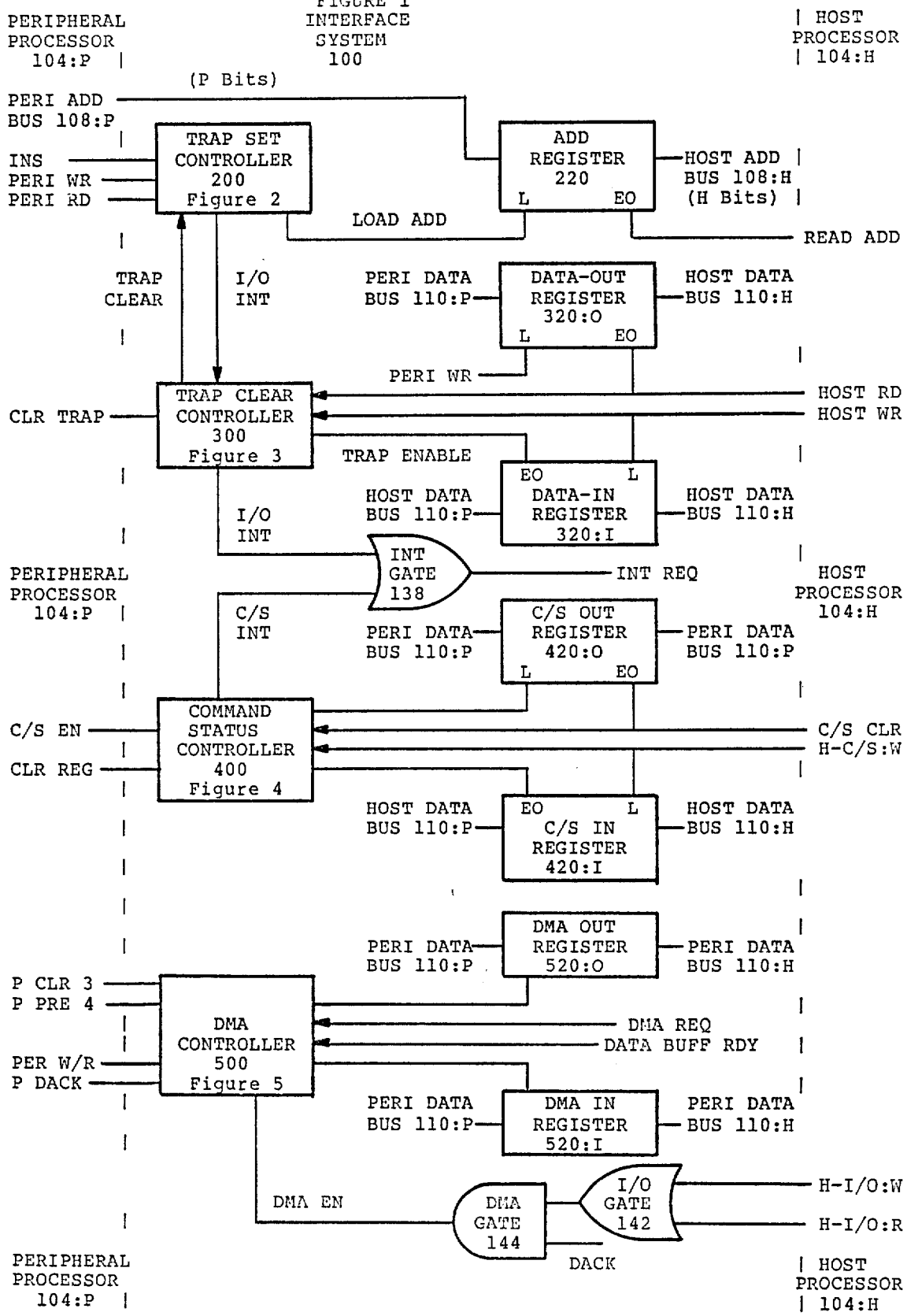
FIG. 1 is a functional block schematic of the Interface System showing the four controller units.
Figure 2:
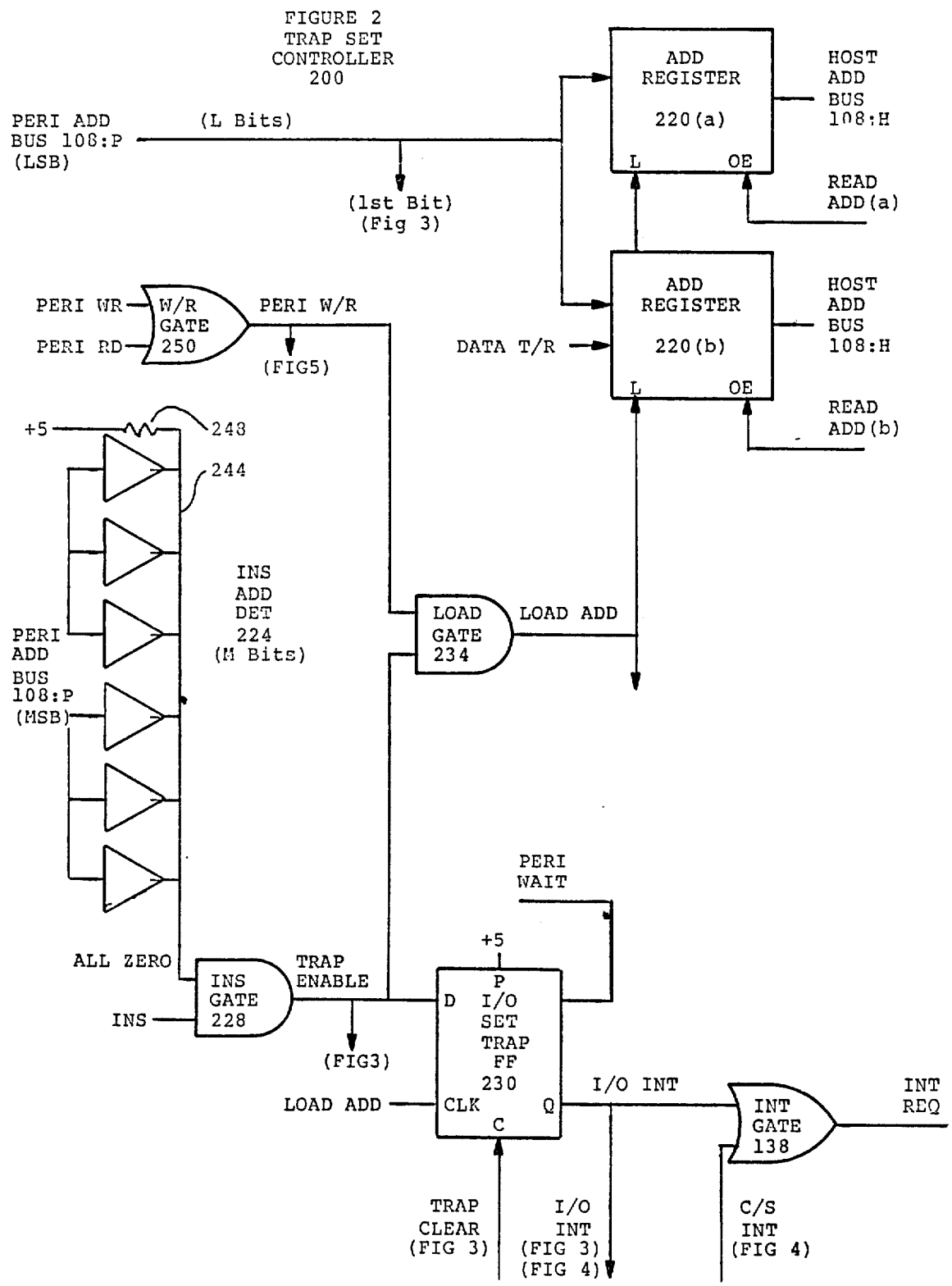
FIG. 2 is a schematic diagram showing Trap Set Controller 200 of FIG. 1.
Figure 3:
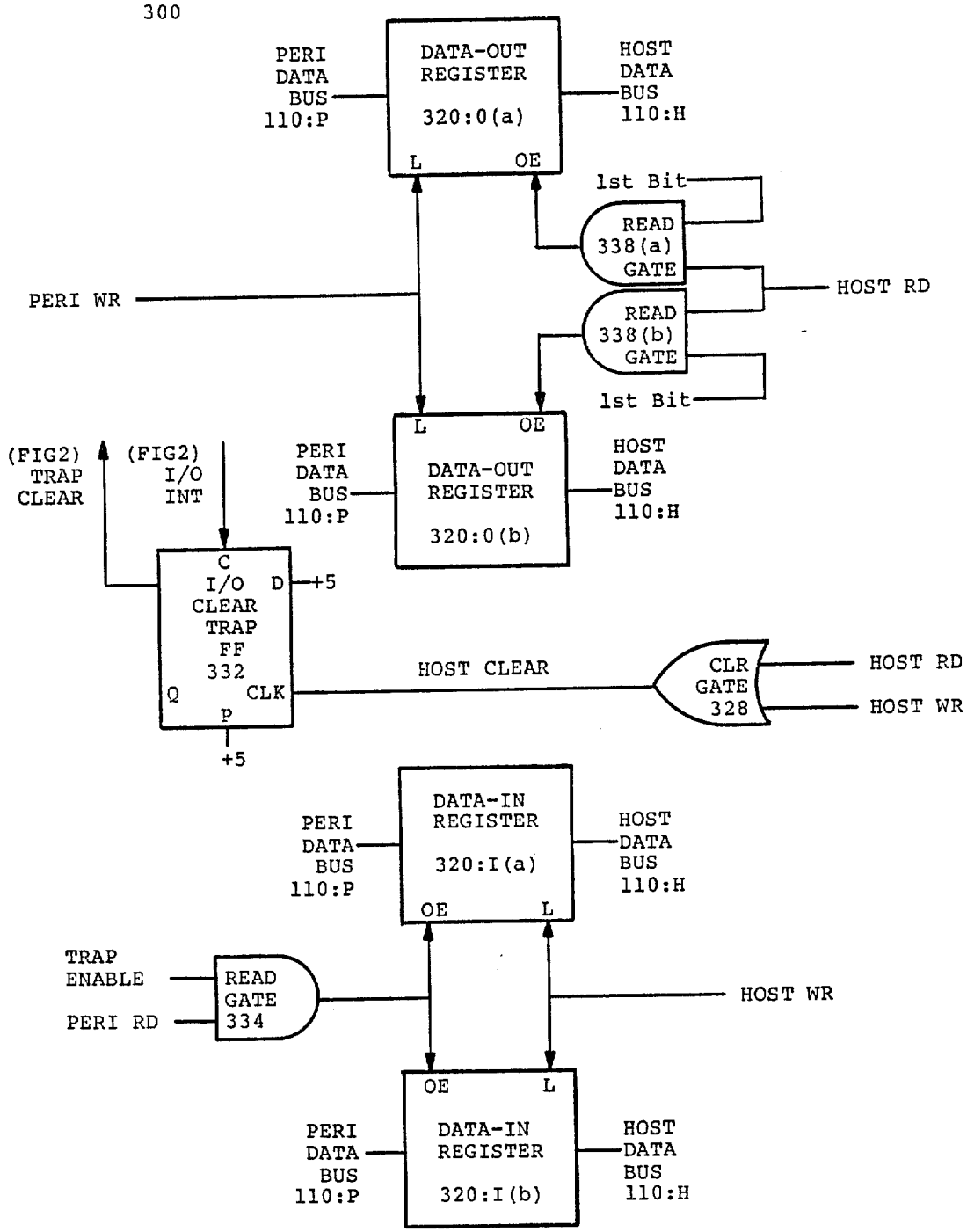
FIG. 3 is a schematic diagram showing Trap Clear Controller 300 of FIG. 1.

Interface System 100 provides communication between Host Computer System 104:H and Peripheral Processor Unit 104:P by transferring address information from Peripheral Address Bus 108:P to Host Address Bus 108:H; and by transferring data information between Host Data Bus 110:H and Peripheral Data Bus 110:P. Interface System 100 has four controllers units each of which controls an I/O function and a set of I/O registers for transferring information. Trap Set Controller 200 (shown in detail in FIG. 2) initiates the transfer from the normal mode to the I/O mode by advancing an instruction address from Peripheral Processor 104:P to Host Computer 104:H through Address Register 220. Trap Clear Controller 300 (shown in detail in FIG. 3) terminates to I/O mode and resets Interface System 100 to normal. In the I/O mode, data flows between Host Computer 104:H and Peripheral Processor 104:P through Data-In Register 320:I and Data-Out Registers 320:0. Command Status Controller 400 (shown in detail in FIG. 4) controls status information through C/S In Register 420:I and C/S Out Register 420:0. DMA Controller 500 controls (shown in detail in FIG. 5) direct memory access data through DMA In Register 520:I, and DMA Out Register 520:0.

In the normal mode of operation of Interface System 100 (the application mode) Peripheral Processor 104:P functions independently of Host Computer 104:H. Peripheral Processor 104:P operates with internal application software which processes data previously supplied by Host Computer 104:H. Peripheral Processor 104:P performs continuously and with minimum interruptions. Interruptions occur only when Peripheral Processor 104:P requires additional instructions or data from Host Computer 104:H. Meanwhile, Host Computer 104:H functions is its usual CPU capacity coordinating I/O devices such as keyboards, monitors, floppy disk drives, printers, modems, and hard disks. Interface System 100 isolates Computers 104 during the normal mode of operation.

Peripheral Processor 104:P preferable has a faster clock and more operating bits than Host Computer 104:H in order to accelerate the data processing. In the embodiment shown, Peripheral Processor 104:P has "P" operating bits (16 bits), and Host Computer 104:H has "H" operating bits (8 bits). Doubling the number of operating bits from H=8 to P=16 complicates the information transfer with Interface Circuit 100; but permits the data to be processed at twice the speed. The clock rate is also increased in the embodiment shown from Hc=4.7 MHz at the host level to Pc=8 MHz at the peripheral level. The increase in processing speed due to the higher peripheral clock rate Pc, is added to the doubled speed due to the increased bit effect. The overall processing speed of Peripheral Unit 104:P is increased by about a factor of three by the cumulative effect of the clock and bit ratios.

TRAP SET CONTROLLER 200
SCHEMATIC DIAGRAM (FIG. 2)

Peripheral Processor 104:P terminates the normal (or independent) mode of Interface System 100 and initiates the trap I/O (or host-peripheral communication) mode, through Trap Set Controller 200 in order to execute an instruction at the host level. Peripheral Processor 104:P provides the address of the instruction to be executed on Peripheral Address Bus 108:P. The instruction address has a LSB portion with "L" bits and a MSB portion with "M" bits, and must have a numerical value which is less than a predetermined critical value such that each bit of the MSB portion is zero. In an embodiment for use with an IBM host machine (8088 based), Peripheral Address Bus 108:P has 16 bits. The LSB portion has ten bits (L=10) and the MSB portion has six bits (M=6). In this IBM compatible embodiment, the critical address value is 3FF hex.

The MSB portion is applied to Instruction Address Detector 224. If each bit of the MSB portion is "0" (low), ALL ZERO (high) advances from Instruction Address Detector 224 to Instruction Gate 228. The other input to Gate 228 receives INS (high) from Peripheral Processor 104:P when the address on Peripheral Address Bus 104:P is an instruction address (and not merely a memory address). The output of Instruction Gate 228 is TRAP ENABLE (high) when both inputs are high. TRAP ENABLE appears at the set input of I/O Set Flipflop 230.

In addition, TRAP ENABLE is combined with PERI W/R (high) by Load Gate 234 to provide LOAD ADD (high) which loads the LSBs into Address Register 220 for transfer to Host Computer 104:H. LOAD ADD also clocks I/O Set Flipflop 230 permitting TRAP ENABLE to establish the Q and Q-bar outputs I/O INT (high) and PERI WAIT (low). PERI WAIT is returned to Peripheral Processor 104:P for placing the data processing in a peripheral wait mode until the instruction in Address Register 220 is executed by Host Computer 104:H. I/O INT provides INT REQ out of Interrupt Gate 138 which advances to Host Computer 104:H.

If the address on Peripheral Address Bus 108:P is only a memory address, then INS-bar (low) appears at Gate 228. If the address is an instruction address, but has a value greater than the critical value; ALL ZERO-bar (low) appears at Gate 228. In either event, TRAP ENABLE remains low, the address is not loaded into Address Register 220, and INT REQ is not forwarded to Host Computer 104:H.

TRAP CLEAR CONTROLLER 300
SCHEMATIC DIAGRAM (FIG. 3)

Host Computer 104:H responds to the INT REQ by forwarding READ ADD to Address Register 220 for retrieving the LSBs of the instruction address. Host Computer 104:H looks up the instruction, and either advances HOST RD for reading data form Peripheral Processor 104:P waiting in Data-Out Register 320:0(a and b), or advances HOST WR to load data from Host Computer 104:H into Data-In Register 320:I(a and b). Data from Peripheral Processor 104:P was previously loaded into Data-Out Registers 320:0 by PERI WR. Data from Host Computer 104:H is read into Peripheral Processor 104:P by PERI RD which is combined with TRAP ENABLE at Read Gate 334 for reading data from Data-In Register 320:I. Both HOST RD and HOST WR appear at Clear Gate 328 for clearing I/O Clear Flipflop 330 and returning the Interface System 100 to the normal mode.

PREFERRED EMBODIMENT

The following particulars of are given as an illustrative example of possible components and operation of Interface System 100. In this example:

Peripheral Processor 104:P may be a 16 bit PC Turbo-186 board employing an Intel 80186 microprocessor (clock rate Pc=8 MHz) with internal RAM, manufactured by Orchid Technology of 47790 Westinghouse Drive, Fremont CA 94539. Additional and more detailed information concerning Peripheral Processor 104:P may be found in the following Orchid Technology publications:

(1) PCturbo 186 High Speed Processor System Owner's Handbook (Pub no HUD-T002 Feb85),
(2) Orchid PCturbo-186 Tip for High Speed Driving (a guide for maximizing peak performance of the PCturbo-186 high speed processor) 1984, and
(3) Blossom Memory Expansion and I/O Card for the IBM Personal Computer (Ver 1.0 Apr84); each of which is hereby incorporated by reference in its entirety into this disclosure.

Host Computer 104:H may be an eight bit IBM compatible computer employing an Intel 8088 microprocessor (clock rate Hc=4.77 MHZ). Additional and more detailed information concerning Host Computer 104:P may be found in the following International Business Machine publications:

(1) Guide to Operations PC User Manual Pub No 6025113
(2) PC Technical Reference Manual Pub No 1502234
(3) Guide to Operations XT User Manual Pub No 6137861
(4) XT Technical Reference Manual Pub No 1502237 each of which is hereby incorporated by reference in its entirety into this disclosure.

Peripheral Address Bus 108:P is a 16 bit bus from Peripheral Processor 104:P for carrying instruction addresses to Interface System 100. The bus has a MSB portion (M=6 bits) which is connected to Instruction Address Detector 224, and a LSB portion (L=10 bits) which is connected to Address Register 220. The LSB portion contains 9 instruction address bits plus one bit for carrying DATA T/R (a data transfer/receive "hardwired" signal from Peripheral Processor 104:P). DATA T/R is transferred to Host Computer 104:H along with the address of the instruction to be executed to indicate whether data is being transmitted from Peripheral Processor 104:P to Host Computer 104:H or received by Peripheral Processor 104:P.

Host Address Bus 108:H is an 8 bit bus from Host Computer 104:P for receiving the LSB portion of the instruction address. DATA T/R and the 9 bits of address are transferred from 16 bit Address Register 220 in two 8 bit installments, in response to READ ADD(a) and READ ADD(b) from Host Computer 104:H.

Peripheral Data Bus 110:P is a 16 bit bus from Peripheral Processor 104:P for carrying data to and from Interface System 100.

Host Data Bus 110:H is an 8 bit bus for carrying data in and out of Host Computer 104:H.

INT (interrupt) Gate 138 is a two input OR gate (one S00) for combining I/O INT from Trap Set Controller 200 and C/S INT from Command Status Controller 400, in order to provide INT REQ to Host Computer 104:H.

I/O Gate 142 is a two input OR gate (one LS08) for combining H-I/O:R (read) and H-I/O:W (write) from Host Computer 104:H.

DMA Gate 144 is a two input AND gate (one LS08) for combining the read/write output of Gate 142 with a DACK (data acknowledge) signal from Host Computer 104:H.

Address Registers 220(a) and 220(b) may be a pair of 8 bit holding registers (two LS373) for holding the LSB portion (9 bits of instruction address plus DATA T/R) for transfer to Host Computer 104:H.

Instruction Address Detector 224 may be a 6 bit array of open collector detector switches (six LS06 inverters). Each detection switch receives one of the 6 bits of the MSB portion at the input thereof. The output of each detection switch is tied to a +5 volt source through common lead 244 and voltage developing or "pull-up" resistor 248 (330 ohms). When each of the MSBs are "0" (low), common lead 244 is ALL ZERO (high). If any bit is non-zero (high) common output 244 is low.

INS (instruction) Gate 228 is a two input AND gate (one S08), for combining ALL ZERO (high) from Instruction Address Detector 224 with instruction present signal INS (a "hardwired" signal from Peripheral Processor 104:P). INS is only high when the address on Peripheral Address Bus 108:P is actually an address bus. If the address is only a memory address, INS-bar (low).

Load Gate 234 is a two input AND gate (one S08) for providing LOAD ADD to Address Registers 220(a) and 220 (b).

Set I/O Flipflop 230 may be a two state device (one S74) for establishing a normal mode when the D input is TRAP ENABLE-bar (low), and for establishing the trap or I/O mode when the D input is TRAP ENABLE (high). During the trap mode, the Q output is I/O INT (high) and the Q-bar output is PERI WAIT (low). PERI WAIT is a "hardwired" signal to Peripheral Processor 104:P. The state of D input is controlling when Flipflop 230 is clocked by LOAD ADD.

W/R (write/read) Gate 250 is a two input OR gate (one S00) for combining PERI WR and PERI RD ("hardwired" signals from Peripheral Processor 104:P), to provide PERI W/R to Load Gate 234. Peripheral Processor 104:P must be in the write or read mode for the trapping sequence to proceed into INT REQ to Host Computer 104:H.

Data-Out Registers 320:0(a) and 320:0(b) may be a pair of 8 bit holding registers (two LS373) for holding the 16 bits of data being transferred from Peripheral Processor 104:P to Host Computer 104:H. Both register are loaded simultaneously from 16 bit Peripheral Data Register 110:P by PERI WR (a "hardwired" signal from Peripheral Processor 104:P). The bits are read into Host Computer 104:H 8 bits at a time. The first 8 bits are read from Register 320:0(a) when the instruction address is even by 1st BIT in conjunction with HOST RD through Read Gate 338(a). The second 8 bits are read from Register 320:0(b) when the instruction address is odd by 1st BIT-bar in conjunction with HOST RD through Read Gate 338(b).

Data-In Registers 320:I(a) and 320:I(b) may be a pair of 8 bit holding registers (two LS373) for holding the data received from Host Computer 104:H. Data-In Registers 320:I are read simultaneously by the output of Read Gate 334 for providing 16 bits of data on Peripheral Data Bus 110:P.

Clear Gate 328 is a two input OR gate (one S08) for combining HOST WR and HOST RD to set Flipflop 332.

Clear I/O Flipflop 332 may be a two state device (one S74) for resetting Set Trap Flipflop 230. Flipflop 332 is placed in the trap mode by I/O INT from Flipflop 230, and returned to the normal or clear mode by either HOST WR or HOST RD through Clear Gate 328. Peripheral Processor 104:P is returned to the normal mode by CLEAR TRAP from Flipflop 332 when Host Computer 104:H has either received or supplied the required data.

Read Gate 334 is a two input AND gate (one S00) for combining TRAP ENABLE and PERI RD to read data from Host Compute 104:H waiting in Data In Registers 320:I(a) and 320:I(b).

Read Gate 338(a) is a two input AND gate (one S32) for reading data out of Data-Out Register 320:0(a) in response to HOST RD and 1st Bit.

Read Gate 338(b) is a two input AND gate (one S32) for reading data out of Data-Out Register 320:0(b) in response to HOST RD and 1st Bit-bar.

C/S Out Register 420:0 may be an 8 bit holding register (one LS374) for holding command status information being transferred to Host Computer 104:H.

C/S In Register 420:I may be an 8 bit holding register (one LS374) for holding command status information received from Host Computer 104:H.

C/S Flipflop 430 may be a two state device (one S74) for providing C/S INT to Int Gate 138.

Reg Full Flipflop 432 may be a two state device (one S74) for resetting C/S Flipflop 430.

DMA Out Register 520:0 may be an 8 bit holding register (one LS374) for holding DMA data being transferred to Host Computer 104:H.

DMA In Register 520:I may be an 8 bit holding register (one LS374) for holding DMA data received from Host Computer 104:H.

DMA Clear Flipflop 530 may be a two state device (one S74) for selecting among DMA Gates 543.

DMA ACK Flipflop 532 may be a two state device (one S74) responsive to DMA EN and DMA ACK for initiating DMA accessing between Host Computer 104:H and Peripheral Processor 104:P.

DMA Gate 534:OR is a two input AND gate (one LS32) for reading data out of DMA Out Register 520:0 in response to DMA-EN and the setting of DMA Clear Flipflop 530.

DMA Gate 534:OW is a two input AND gate (one LS32) for writing data into DMA Out Register 520:0 in response to Gate 528 and the clearing of DMA Clear Flipflop 530.

DMA Gate 534:IW is a two input AND gate (one LS32) for writing data into DMA In Register 520:I in response to Gate 528 and the clearing of DMA Clear Flipflop 530.

DMA Gate 534:IR is a two input AND gate (one LS32) for reading data out of DMA Out Register 520:0 in response to DMA-EN and the setting of DMA Clear Flipflop 530.

IRQ Enable Register 520 may be an 8 bit holding register (one LS374) for holding DMA control signals being transferred to Host Computer 104:H.

The values and IC components given below are not intended as defining the limitations of the invention. Numerous other applications and configurations are possible.

Detailed information concerning the IC components is available in a publication entitled "The TTL Data Handbook for Engineers", 2nd Edition 1976, by the Engineering Staff of Texas Instruments Inc; which publication is hereby incorporated by reference in its entirety into this disclosure.

CONCLUSION

Clearly various changes may be made in the structure and embodiments shown herein without departing from the concept of the invention. Further, the features of the embodiments shown in the various Figures may be employed with the embodiments of the other Figures.

Therefore, the scope of the invention is to be determined by the terminology of the following claims and the legal equivalents thereof.

I claims as my invention:

1. A computer interface system having an application mode of operation and an I/O mode of operation, for connection between a host computer and a peripheral processor which operate independently from one on another during the application mode of operation and which communicate with one another through the interface system during the I/O mode of operation, comprising:

peripheral bus means for connection to the peripheral processor, having a peripheral address portion for receiving instruction addresses from the peripheral processor, and having a peripheral data portion for transferring data from the peripheral processor to the interface system and from the interface system to the peripheral processor;

host bus means for connection to the host computer, having a host address portion for receiving instruction addresses from the interface system and having a host data portion for transferring data from the host computer to the interface system and from the interface system to the host computer;

instruction address detector means responsive to a predetermine pattern of binary values on at least a portion of the address bits within one instruction address at a time on the address portion of the peripheral bus means;

I/O set means responsive to the instruction address detector means for terminating the application mode of operation and initiating the I/O mode of operation;

I/O clear means responsive to a host clear signal from the host computer for terminating the I/O mode of operation and returning the interface system to the application mode of operation;

address transfer means for storing instruction addresses from the address portion of the peripheral bus means in response to a write signal from the peripheral processor, and for transferring the instruction addresses to the host computer on the host bus means in response to a read address signal from the host computer;

data-out transfer means for storing data from the peripheral bus means in response to a peripheral write signal from the peripheral processor, and for transferring the data to the host computer on the host bus means in response to a host data read signal from the host computer; and data-in transfer means for storing data from the host bus means in response to a host write signal from the host computer, and for transferring the data to the peripheral processor on the peripheral bus means in response to a peripheral read signal from the peripheral processor.

2. The interface system of claim 1, wherein the predetermined pattern of binary values within the one instruction address is a sequence of binary bits for terminating the application mode of operation and initiating the I/O mode of operation.

3. The interface system of claim 1, wherein each instruction address on the peripheral bus means has a least significant portion of "L" bits and a most significant portion of "M" bits, and wherein the instruction address detector means comprises a plurality of zero detectors responsive to the binary number "0" on the M address bits within the instruction addresses on the peripheral bus means, for providing an enable signal to the I/O set means for terminating the application mode of operation and initiating the I/O mode of operation when each of the M bits is "0". .

4. The interface system of claim 3, wherein only the L bits of the least significant portion are stored in the address transfer means and transferred to the host computer.

5. The interface system of claim 3, wherein L has ten bits and M has six bits.

6. The interface system of claim 5, wherein L has nine instruction address bits and one data transmit receive signal for indicating to the host computer whether the peripheral processor is transmitting data or receiving data.

7. The interface system of claim 3, wherein an instruction address on the peripheral bus which is equal to or less than 3FF Hex terminates the normal mode of operation.

8. The interface system of claim 3, wherein the plurality of zero detectors is a set of open collector detector switches having a common output, with each detector switch having an input connected to one of the bits in the M portion of the address bits.

9. The interface system of claim 8, wherein the detector switches establishes an all zero signal on the common output when each bit of the M portion of address bits is zero.

10. The interface system of claim 9, wherein the instruction address detector means further comprises an instruction AND means for combining the all zero signal from the plurality of zero detectors with an instruction present signal from the peripheral computer when the information on the peripheral bus is an instruction address, to provide an enable signal to the I/O set means.

* * * * *